US008511707B2

(12) United States Patent
Amamori et al.

(10) Patent No.: US 8,511,707 B2
(45) Date of Patent: Aug. 20, 2013

(54) DRIVER-AIRBAG-APPARATUS-ATTACHING STRUCTURE AND STEERING WHEEL

(75) Inventors: Ichiro Amamori, Tokyo (JP); Hiroki Shibata, Tokyo (JP)

(73) Assignee: Takata Corporation, Tokyo (JP)

( * ) Notice: Subject to any disclaimer, the term of this patent is extended or adjusted under 35 U.S.C. 154(b) by 17 days.

(21) Appl. No.: 13/131,940

(22) PCT Filed: Oct. 8, 2009

(86) PCT No.: PCT/JP2009/067532
§ 371 (c)(1),
(2), (4) Date: Jun. 27, 2011

(87) PCT Pub. No.: WO2010/064488
PCT Pub. Date: Jun. 10, 2010

(65) Prior Publication Data
US 2011/0248481 A1    Oct. 13, 2011

(30) Foreign Application Priority Data

Dec. 2, 2008 (JP) ................................ 2008-307614

(51) Int. Cl.
*B60R 21/203* (2006.01)
(52) U.S. Cl.
USPC ..................................................... 280/728.2
(58) Field of Classification Search
USPC ............... 280/728.3, 731, 728.2; 200/61.54, 200/61.55; 403/329, 397, DIG. 14; 24/297, 24/458, 572.1
See application file for complete search history.

(56) References Cited

U.S. PATENT DOCUMENTS 5,100,015 A * 3/1992 Vanderstuyf .................. 220/326
5,409,256 A * 4/1995 Gordon et al. ............. 280/728.2
(Continued)

FOREIGN PATENT DOCUMENTS

| CN | 1652412 A | 8/2005 |
| JP | H09-226501 A | 9/1997 |

(Continued)

OTHER PUBLICATIONS

International Search Report from the International Bureau of WIPO for International Application No. PCT/JP2009/067532 dated Nov. 24, 2009 (2 pages) and an English translation of the same (2 pages).

(Continued)

*Primary Examiner* — Joseph Rocca
*Assistant Examiner* — Robert A Coker
(74) *Attorney, Agent, or Firm* — Fitch, Even, Tabin & Flannery, LLP

(57) ABSTRACT

A driver-airbag-apparatus-attaching structure is provided having a simple configuration and with which space can be saved. A snap-lock mechanism includes brackets projecting from the front surface of a steering hub portion, attachment pieces projecting from the bottom surface of a retainer of a driver airbag apparatus in such a manner as to overlap the brackets, openings provided in the brackets, and projecting portions projecting from surfaces of the respective attachment pieces that are to face the respective brackets. The projecting portions are continuous with the attachment pieces with respective elastically deformable portions interposed therebetween. When the driver airbag apparatus is bought near to the steering hub portion, the attachment pieces move along the brackets, and the projecting portions receive reactive forces from the brackets, whereby the elastically deformable portions elastically deform. When the projecting portions reach the openings, the elastically deformable portions elastically restore the original forms, and the projecting portions engage with the openings.

7 Claims, 9 Drawing Sheets

(56) References Cited

U.S. PATENT DOCUMENTS

| | | | | |
|---|---|---|---|---|
| 5,577,779 | A * | 11/1996 | Dangel | 292/80 |
| 5,738,369 | A | 4/1998 | Durrani | |
| 5,788,268 | A * | 8/1998 | Goss et al. | 280/728.2 |
| 5,931,492 | A | 8/1999 | Mueller et al. | |
| 5,931,514 | A * | 8/1999 | Chung | 292/89 |
| 6,006,941 | A * | 12/1999 | Hitchings | 220/284 |
| 6,318,585 | B1 * | 11/2001 | Asagiri et al. | 220/788 |
| 6,783,150 | B2 * | 8/2004 | Ahlquist | 280/728.2 |
| 6,840,537 | B2 * | 1/2005 | Xu et al. | 280/731 |
| 7,118,124 | B2 | 10/2006 | Weis et al. | |
| 7,413,479 | B1 * | 8/2008 | Volpone | 439/692 |

FOREIGN PATENT DOCUMENTS

| | | |
|---|---|---|
| JP | H11-059304 A | 3/1999 |
| JP | 2000-118345 A | 4/2000 |
| JP | 2001-501887 A | 2/2001 |
| JP | 2001-341651 A | 12/2001 |
| JP | 2001-354100 A | 12/2001 |
| JP | 2002-002433 A | 1/2002 |
| JP | 2002-012112 A | 1/2002 |
| JP | 2002-012117 A | 1/2002 |
| JP | 2006-218886 A | 8/2006 |
| JP | 3934575 B2 | 6/2007 |
| WO | 98/15431 A1 | 4/1998 |

OTHER PUBLICATIONS

Notification of the First Office Action issued in counterpart Chinese Application No. 200980148604.8 dated Jan. 23, 2013 and an English translation of the same (16 pages).

* cited by examiner

DRIVER-AIRBAG-APPARATUS-ATTACHING STRUCTURE AND STEERING WHEEL

CROSS-REFERENCE TO RELATED APPLICATIONS

This application is a U.S. national phase application filed under 35 U.S.C. §371 of International Application PCT/JP2009/067532, filed on Oct. 8, 2009, designating the United States, which claims priority from JP 2008-307614, filed Dec. 2, 2008, which are hereby incorporated herein by reference in their entirety.

FIELD OF THE INVENTION

The present invention relates to a driver-airbag-apparatus-attaching structure with which a driver airbag apparatus is attached to the front surface of a steering wheel, and particularly to a driver-airbag-apparatus-attaching structure that enables a driver airbag apparatus to be attached to a steering wheel with the aid of a snap-lock mechanism. The present invention also relates to a steering wheel to which a driver airbag apparatus is attached with the driver-airbag-apparatus-attaching structure.

BACKGROUND OF THE INVENTION

A driver-airbag-apparatus-attaching structure that enables a driver airbag apparatus to be attached to a steering wheel with a single motion with the aid of a snap-lock mechanism is disclosed in Japanese Unexamined Patent Application Publication No. 2002-12117.

In the above publication, a driver airbag apparatus has a plurality of pins projecting toward a steering wheel, and the steering wheel has a plurality of through holes into which the respective pins are fitted. The pins have respective hook portions at the tips thereof.

The steering wheel is provided with a retaining member attached to the back side thereof. The retaining member is provided on the back side thereof with an anchoring wire that engages with the hook portions of the pins fitted in the respective through holes and thus anchors the pins. The anchoring wire is made of an elastic metal wire material. The anchoring wire runs along the back surface of the retaining member across the through holes. The retaining member has locking portions provided adjacent to the respective through holes and retaining the anchoring wire. The anchoring wire is retained by the locking portions in such a manner as to be elastically deformable so that the anchoring wire retracts to the outside of the through holes by being pushed by the pins when the pins are inserted into the through holes.

In attaching the driver airbag apparatus to the steering wheel, the driver airbag apparatus is positioned on the front-surface side of the steering wheel, the pins of the driver airbag apparatus are fitted into the respective through holes of the steering wheel, and the driver airbag apparatus is brought near to the steering wheel. Thus, the pins are pushed into the respective through holes, the hook portions at the tips of the respective pins push the anchoring wire aside, and the hook portions project from the back side of the steering wheel. Subsequently, when the anchoring wire goes over the hook portions, the anchoring wire elastically restores the original form and is caught by the hook portions, whereby the driver airbag apparatus is prevented from moving away from the steering wheel. Thus, the work of attaching the driver airbag apparatus to the steering wheel is finished.

In Japanese Unexamined Patent Application Publication No. 2002-12117, the anchoring wire is provided around a metal core of the steering wheel in such a manner as to sequentially run across the through holes. Meanwhile, there is another configuration in which the through holes are provided with respective anchoring wires.

In the driver-airbag-apparatus-attaching structure disclosed in Japanese Unexamined Patent Application Publication No. 2002-12117, the anchoring wire needs to be provided on the back side of the steering wheel in such a manner as to run across the through holes of the steering wheel, and the locking portions that retain the anchoring wire in such a manner as to be elastically displaceable need to be provided adjacent to the respective through holes. Therefore, the mechanism has a complicated configuration.

Furthermore, in a case where the anchoring wire is provided around the metal core of the steering wheel as disclosed in Japanese Unexamined Patent Application Publication No. 2002-12117 or a plurality (typically, three) of anchoring wires are provided for the through holes, respectively, the anchoring wire or wires occupy a relatively large space within a steering-wheel plane, including the space required for the anchoring wire to be displaced within the steering-wheel plane when the driver airbag apparatus is attached. This may limit the provision of devices such as a damper, a paddle switch, and a cruise control switch, excluding the driver-airbag-apparatus-attaching structure, within the steering-wheel plane.

SUMMARY OF INVENTION

It is an object of the present invention to provide a driver-airbag-apparatus-attaching structure having a simple configuration and with which space can be saved, and to provide a steering wheel to which a driver airbag apparatus is attached with the driver-airbag-apparatus-attaching structure.

A first aspect provides a driver-airbag-apparatus-attaching structure with which a driver airbag apparatus is attached to a front surface of a steering wheel. The driver-airbag-apparatus-attaching structure enables the driver airbag apparatus to be attached to the steering wheel with the aid of a snap-lock mechanism. The snap-lock mechanism includes a bracket projecting from the front surface of the steering wheel, an attachment piece projecting from a bottom surface of the driver airbag apparatus toward the steering wheel in such a manner as to overlap the bracket, an engaging portion provided on a surface of the bracket that is to face the attachment piece, and a projecting portion projecting from a surface of the attachment piece that is to face the bracket. When the driver airbag apparatus is bought near to the steering wheel, the attachment piece moves along the bracket, and the projecting portion receives a reactive force from the bracket, whereby the attachment piece elastically deforms. When the projecting portion reaches the engaging portion, the attachment piece elastically restores the original form, and the projecting portion engages with the engaging portion, whereby the driver airbag apparatus is attached to the steering wheel.

According a second aspect, the driver-airbag-apparatus-attaching structure according to the first aspect includes a guide portion that guides the attachment piece when the attachment piece moves along the bracket.

According to a third aspect, in the driver-airbag-apparatus-attaching structure according to the second aspect, the guide portion is provided on the attachment piece.

According to a fourth aspect, in the driver-airbag-apparatus-attaching structure according to any of the first to third aspects, the snap-lock mechanism is one of two snap-lock mechanisms provided on opposite sides of a position near the center of the steering wheel.

According to a fifth aspect, the driver-airbag-apparatus-attaching structure according to the fourth aspect includes a contact portion at which the driver airbag apparatus and the steering wheel come into contact with each other, the contact portion preventing the driver airbag apparatus from turning about a line connecting the two snap-lock mechanisms.

According to a sixth aspect, in the driver-airbag-apparatus-attaching structure according to any of the first to fifth aspects, the attachment piece is provided at a position nearer to the center of the steering wheel with respect to the bracket, and the bracket has an insertion portion that receives a pressing tool with which the attachment piece is pushed and moved away from the bracket toward the center of the steering wheel.

According to a seventh aspect, in the driver-airbag-apparatus-attaching structure according to the sixth aspect, the engaging portion is a through hole extending through the bracket, the through hole being the insertion portion.

According to an eighth aspect, in the driver-airbag-apparatus-attaching structure according to the sixth or seventh aspect, the bracket has a tool guide that guides the insertion of the tool into the insertion portion.

A ninth aspect provides a steering wheel to which a driver airbag apparatus is attached with the driver-airbag-apparatus-attaching structure according to any of the first to eighth aspects.

In the driver-airbag-apparatus-attaching structure according to the present invention and the steering wheel according to the present invention to which a driver airbag apparatus is attached with the driver-airbag-apparatus-attaching structure, the attachment piece projecting from the bottom surface of the driver airbag apparatus elastically deforms, whereby the projecting portion provided on the attachment piece elastically engages with the engaging portion of the bracket standing from the front surface of the steering wheel. Therefore, no anchoring wires for anchoring the attachment piece need to be provided on the steering wheel. Accordingly, the driver-airbag-apparatus-attaching structure can have a simple configuration. Note that, in the present invention, the bottom surface of the driver airbag apparatus refers to a surface of the driver airbag apparatus facing the steering wheel in a state where the driver airbag apparatus has been attached to the steering wheel.

Furthermore, since no anchoring wires are provided within the steering-wheel plane, the space in the steering-wheel plane that is occupied by the driver-airbag-apparatus-attaching structure can be reduced. Therefore, limitations in providing devices such as a damper, a paddle switch, and a cruise control switch, excluding the driver-airbag-apparatus-attaching structure, within the steering-wheel plane are reduced or eliminated.

In the second aspect, the guide portion that guides the attachment piece when the attachment piece moves along the bracket is provided. Therefore, when the driver airbag apparatus is brought near to the steering wheel, the attachment piece assuredly moves along the bracket. Thus, the projecting portion of the attachment piece can be assuredly made to engage with the engaging portion of the bracket.

As in the third aspect, the guide portion is preferably provided on the attachment piece. Such a configuration facilitates the molding of the steering wheel.

As in the fourth aspect, if two snap-lock mechanisms are provided on opposite sides of a position near the center of the steering wheel, space can be saved and the driver airbag apparatus can be firmly attached to the steering wheel.

In this case, as in the fifth aspect, a contact portion at which the driver airbag apparatus and the steering wheel come into contact with each other is preferably provided so as to prevent the driver airbag apparatus from turning about a line connecting the two snap-lock mechanisms.

In the sixth aspect, in the state where the driver airbag apparatus has been attached to the steering wheel, the pressing tool is inserted into the insertion portion of the bracket, and the attachment piece is pushed with the tool toward the center of the steering wheel in such a manner as to move away from the bracket. Thus, the driver airbag apparatus can be removed from the steering wheel.

In this case, if the engaging portion of the bracket is provided as a through hole extending through the bracket as in the seventh aspect, the driver airbag apparatus can be easily removed from the steering wheel by inserting the tool into the through hole from a side of the bracket farther from the attachment piece.

If the bracket has a tool guide that guides the insertion of the tool as in the eighth aspect, the driver airbag apparatus can be smoothly removed from the steering wheel.

DETAILED DESCRIPTION OF THE PREFERRED EMBODIMENTS

Embodiments of the present invention will now be described with reference to the drawings.

Figure 1:
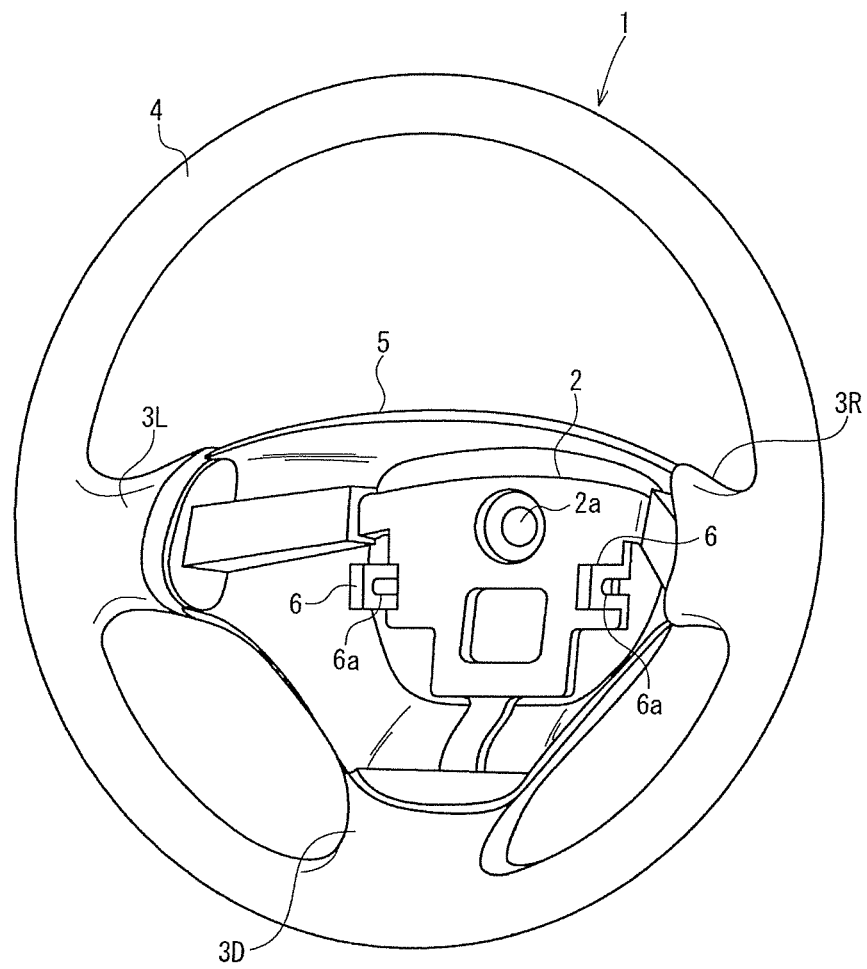
FIG. 1 is a perspective view of a steering wheel to which a driver airbag apparatus is attached with a driver-airbag-apparatus-attaching structure according to an embodiment.
Figure 2:
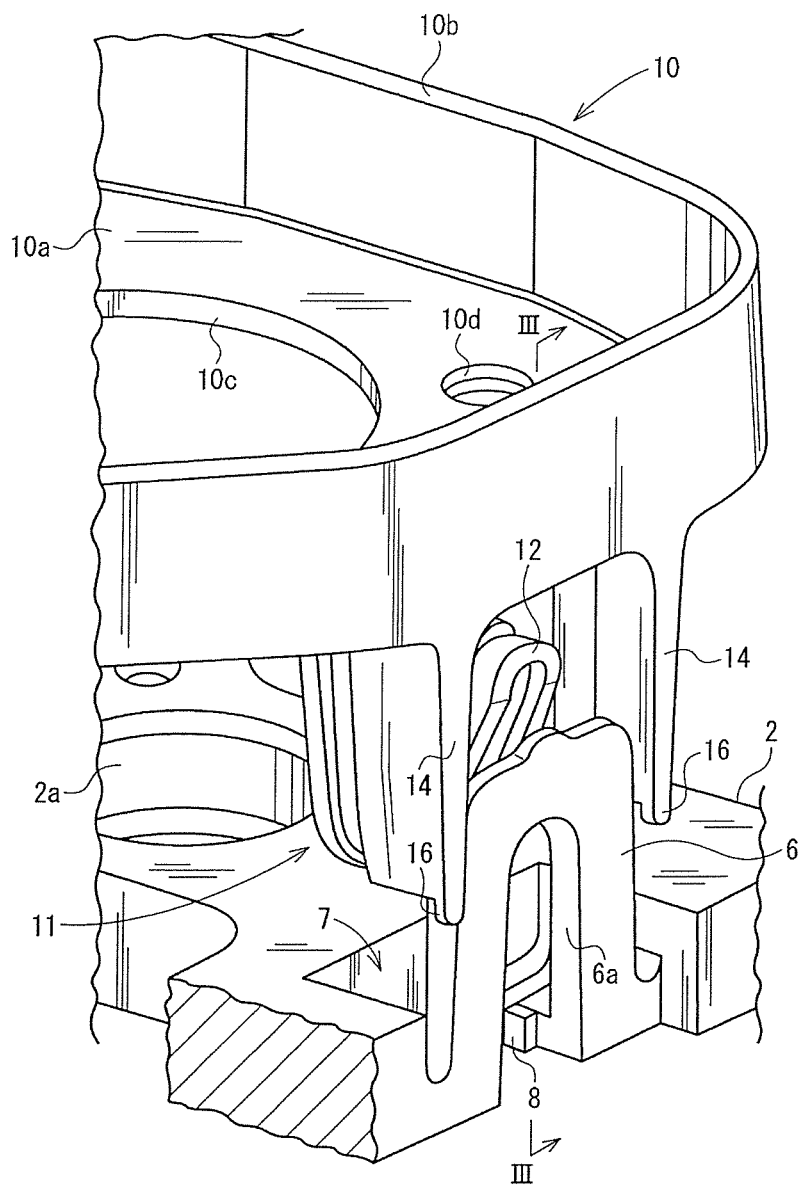
FIG. 2 is a perspective view (exploded view) of a snap-lock mechanism.
Figure 3:
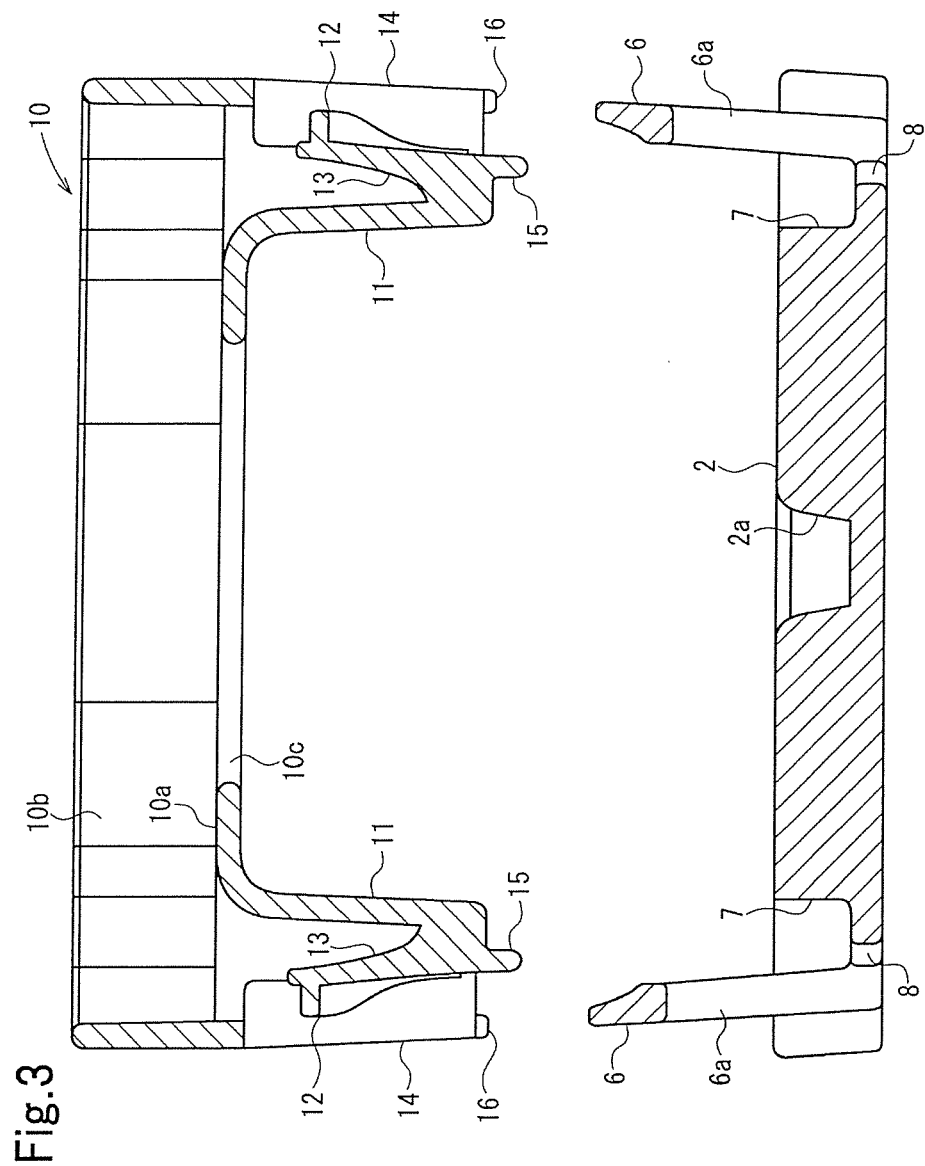
FIG. 3 is a sectional view of a retainer and a steering hub portion taken along line of FIG. 2.
Figure 4:
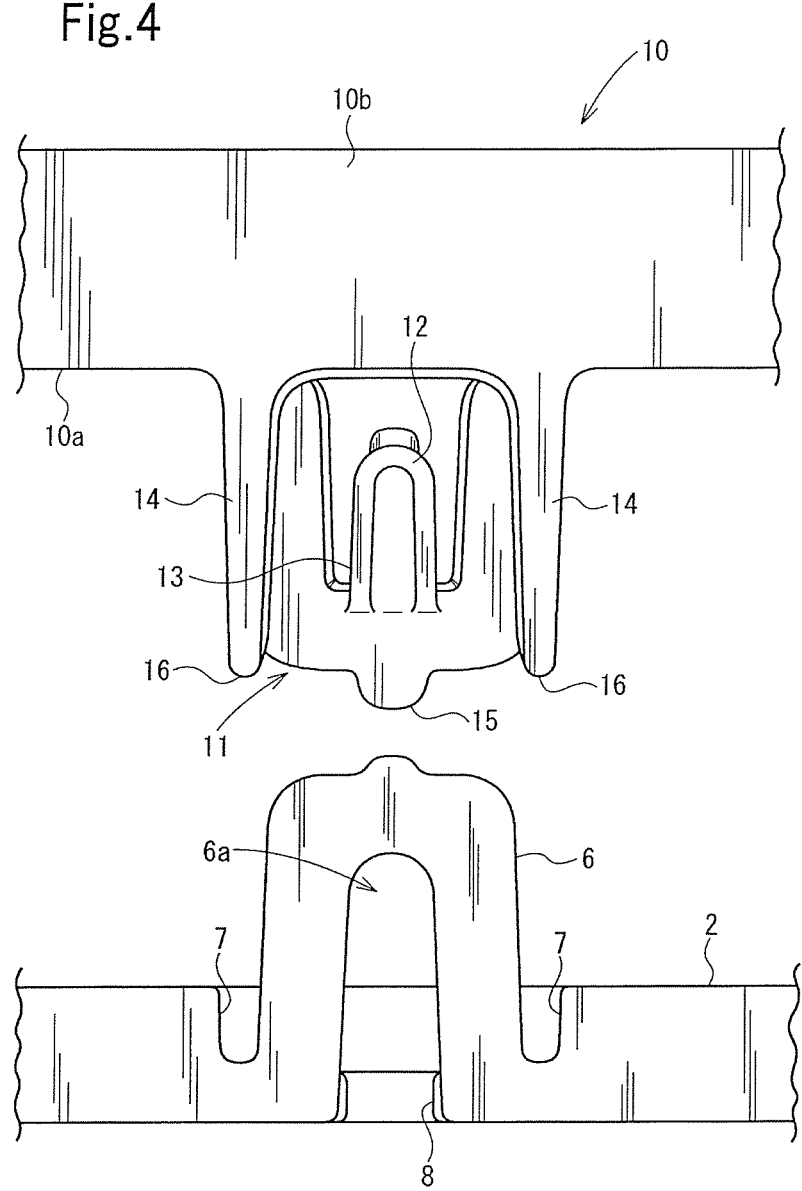
FIG. 4 is a front side view (exploded view) of the snap-lock mechanism seen from a side thereof nearer to the outer periphery of the steering wheel.
Figure 5:
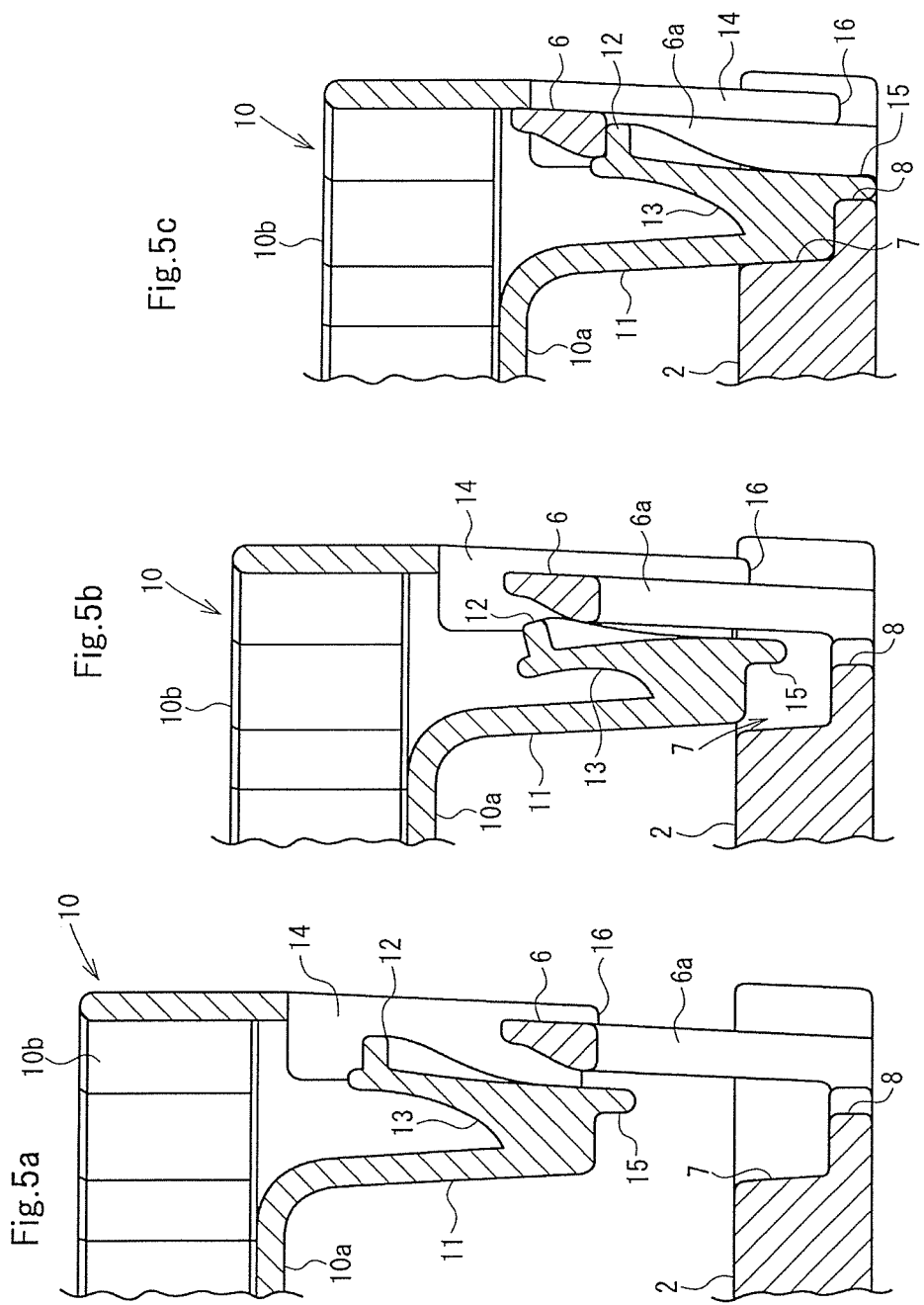
FIGS. 5a, 5b, and 5c are sectional views illustrating the operation of the snap-lock mechanism.

FIG. 1 is a perspective view of a steering wheel to which a driver airbag apparatus is attached with a driver-airbag-apparatus-attaching structure according to an embodiment. FIG. 2 is a perspective view (exploded view) of a snap-lock mechanism. FIG. 3 is a sectional view of a retainer and a steering hub portion taken along line III-III of FIG. 2. FIG. 4 is a front view (exploded view) of the snap-lock mechanism seen from a side thereof nearer to the outer periphery of the steering wheel. FIGS. 5a to 5c are sectional views illustrating the operation of the snap-lock mechanism. Note that FIG. 5a illustrates a state of the snap-lock mechanism before a projecting portion and an engaging portion engage with each other, FIG. 5b illustrates a state where the projecting portion and the engaging portion are being made to engage with each other, and FIG. 5c illustrates a state after the projecting portion and the engaging portion have engaged with each other.

In the following description, the vertical direction and lateral direction of the steering wheel refer to the vertical direction and lateral direction, respectively, in a steering-wheel plane defined when the steering wheel that is in a steering orientation for the straightforward movement of the vehicle is seen from the occupant side. Furthermore, the anteroposterior direction corresponds to the axial direction of the steering wheel, the occupant side is referred to as the front side, and the counter-occupant side is referred to as the rear side or the back side. The vertical direction, lateral direction, and anteroposterior direction of the driver airbag apparatus correspond to the vertical direction, lateral direction, and anteroposterior direction, respectively, of the steering wheel with the driver airbag apparatus attached thereto. In FIGS. 2 to 5, the axial direction of the steering wheel corresponds to the vertical direction of each drawing.

As illustrated in FIG. 1, a steering wheel 1 in this embodiment is of a so-called three-spoke type with spoke portions 3L, 3R, and 3D extending from a steering hub portion 2 provided in the center thereof in three respective directions to the left and right (i.e., in the three-o'clock and nine-o'clock directions) and to the bottom (i.e., in the six-o'clock direction). The tips of the respective spoke portions 3L, 3R, and 3D are continuous with a ring portion 4 forming the outer periphery of the steering wheel 1. The steering hub portion 2 is joined to the tip of a steering shaft (not illustrated). Reference numeral 2a denotes a boss portion to which the steering shaft is connected. Furthermore, a back cover 5 is provided in such a manner as to cover the back side of the steering hub portion 2.

The steering hub portion 2 has brackets 6 for attaching the airbag apparatus, the brackets 6 projecting from the front surface of the steering hub portion 2. In this embodiment, the brackets 6 are provided at two respective positions on the right and left sides with respect to a position near the center (boss portion 2a) of the steering hub portion 2. The brackets 6 each have an opening 6a, as an engaging portion, with which a corresponding one of below-described projecting portions 12 engage.

As illustrated in FIGS. 3 and 4, in this embodiment, the brackets 6 each have a substantially rectangular plate-like shape, with the longitudinal direction thereof being substantially parallel to the axial direction of the steering wheel 1. The brackets 6 are provided such that the plate surfaces thereof face each other. The openings 6a are through holes extending through the respective brackets 6 in the thickness direction of the brackets 6. In this embodiment, the openings 6a each have an oblong-hole shape extending substantially parallel to the axial direction of the steering wheel 1.

In this embodiment, the steering hub portion 2 has on the front surface thereof grooves 7 with which the tips of below-described attachment pieces 11 engage, respectively, the grooves 7 surrounding the base portions of the respective brackets 6. Note that, in this embodiment, the brackets 6 are provided at the right end and the left end, respectively, of the steering hub portion 2, and respective surfaces of the brackets 6 nearer to the outer periphery of the steering wheel 1 are substantially flush with and continuous with the right and left side surfaces, respectively, of the steering hub portion 2 as illustrated in FIG. 2. The grooves 7 each extend in a substantially U shape along a surface of a corresponding one of the brackets 6 nearer to the center of the steering wheel 1 and along surfaces at the vertical-direction ends of the bracket 6.

The ends of each groove 7 are continuous with a corresponding one of the right and left side surfaces of the steering hub portion 2.

Each groove 7 includes a recess 8 in a portion thereof extending vertically along the surface of the corresponding bracket 6 nearer to the center of the steering wheel 1, the recess 8 being provided near the center of the foregoing portion in the direction in which the portion extends. A corresponding one of below-described first guide projections 15 are configured to engage with each recess 8.

The driver airbag apparatus is to be provided on the occupant side of the steering hub portion 2.

The driver airbag apparatus includes an airbag (not illustrated), an inflator (not illustrated) for inflating the airbag, a retainer 10 to which the airbag and the inflator are attached, a module cover (not illustrated) provided on the front-surface side of the retainer 10 in such a manner as to cover a folded body of the airbag, and so forth.

In this embodiment, the retainer 10 includes a main plate portion 10a that faces the steering hub portion 2 when the driver airbag apparatus is positioned on the occupant side of the steering hub portion 2, and a peripheral wall portion 10b standing from the peripheral edge of the main plate portion 10a toward the front. The main plate portion 10a has near the center thereof an inflator opening 10c into which the inflator is fitted. Bolt-fitting holes 10d into which bolts (not illustrated) for securing the inflator and the airbag to the main plate portion 10a are fitted are provided in a portion around the inflator opening 10c. In this embodiment, the back surface (a surface nearer to the steering wheel) of the main plate portion 10a of the retainer 10 forms the bottom surface of the driver airbag apparatus.

A pair of attachment pieces 11 project from the back surface of the main plate portion 10a of the retainer 10. The attachment pieces 11 are provided at two respective positions on the right and left sides with respect to the center (the inflator opening 10c) of the main plate portion 10a in such a manner as to overlap the respective brackets 6 when the driver airbag apparatus is positioned on the occupant side of the steering hub portion 2. In this embodiment, the attachment pieces 11 are provided in such a manner as to each overlap a corresponding one of the brackets 6 on a side nearer to the center of the steering wheel 1 when the driver airbag apparatus is positioned on the occupant side of the steering hub portion 2. The attachment pieces 11 each have a projecting portion 12 projecting from a surface thereof facing a corresponding one of the brackets 6 (i.e., a surface of each attachment piece 11 nearer to the outer periphery of the steering wheel 1), the projecting portion 12 being configured to engage with the opening 6a of the bracket 6.

As illustrated in FIG. 3, each projecting portion 12 has a substantially wedge-like shape, with the amount of projection from a corresponding one of the attachment pieces 11 being reduced toward the rear-end side (a side nearer to the steering hub portion 2). An end surface of the projecting portion 12 on the front-end side (the side farther from the steering hub portion 2) extends in a direction substantially orthogonal to the axial direction of the steering wheel 1.

The rear-end side of the projecting portion 12 is continuous with the attachment piece 11 with an elastically deformable portion 13 interposed therebetween. When a pressing force is applied to the projecting portion 12 toward the center of the steering wheel 1, the elastically deformable portion 13 elastically deforms, and the projecting portion 12 moves toward the center of the steering wheel 1, whereby the amount of projection of the projecting portion 12 from the attachment piece 11 is reduced. When the pressing force is removed, the elastically deformable portion 13 elastically restores the original form, and the projecting portion 12 returns to the original position.

In this embodiment, the bracket 6, the opening 6a, the attachment piece 11, the projecting portion 12, and the elastically deformable portion 13 form a snap-lock mechanism that joins the driver airbag apparatus to the steering wheel.

Each attachment piece 11 has guide pieces 14 projecting from the vertical-direction edges, respectively, thereof toward the outer periphery of the steering wheel 1. The guide pieces 14 extend substantially parallel to the axial direction of the steering wheel 1. The gap between the guide pieces 14 and 14 of the attachment piece 11 is substantially the same as or slightly larger than the vertical-direction width of the bracket 6. The lateral-direction width of each guide piece 14 (the width in the direction of projection from the surface of the attachment piece 11 nearer to the outer periphery of the steering wheel 1) is larger than the thickness of the bracket 6.

As illustrated in FIG. 2, when the driver airbag apparatus is positioned on the occupant side of the steering hub portion 2 and each attachment piece 11 is made to overlap a corresponding one of the brackets 6 on the side nearer to the center of the steering wheel 1, the bracket 6 is fitted between the guide pieces 14 and 14 of the attachment piece 11, whereby the guide pieces 14 overlap the respective vertical-direction side surfaces of the attachment piece 11.

In this embodiment, the guide pieces 14 form a guide portion for guiding the attachment piece 11 that moves along the bracket 6.

In this embodiment, when the driver airbag apparatus is brought near to the steering hub portion 2, the tips of the guide pieces 14 and the attachment pieces 11 (ends of the guide pieces 14 and the attachment pieces 11 on the side nearer to the steering hub portion 2, the same applies hereinafter) engage with the individual grooves 7.

In this embodiment, as illustrated in FIGS. 3 and 4, the attachment pieces 11 each have a first guide projection 15 projecting from the end surface at the tip thereof toward the steering hub portion 2. When the tip of each attachment piece 11 engages with a corresponding one of the grooves 7, the first guide projection 15 engages with the recess 8 provided in the groove 7.

Furthermore, as illustrated in FIGS. 2 and 3, the guide pieces 14 each have a second guide projection 16 projecting from the end surface at the tip thereof toward the steering hub portion 2, the second guide projection 16 being provided on the side nearer to the outer periphery of the steering wheel 1. As described above, in this embodiment, the lateral-direction width of each guide piece 14 is larger than the thickness of the bracket 6. Therefore, when the tip of each guide piece 14 engages with the groove 7, an end of the guide piece 14 on the side nearer to the outer periphery of the steering wheel 1 projects toward the lateral side of the steering hub portion 2 from a corresponding one of the ends of the groove 7 as illustrated in FIG. 5c. In this state, each second guide projection 16 engages with a corresponding one of the right and left side surfaces of the steering hub portion 2.

In this embodiment, the retainer 10 is a molded component made of synthetic resin and includes the main plate portion 10a, the peripheral wall portion 10b, the attachment pieces 11, the projecting portions 12, the elastically deformable portions 13, the guide pieces 14, the first guide projections 15, and the second guide projections 16 that are made of a common molding material and are molded into an integral body. However, the material of the retainer 10 and the method of manufacturing the retainer 10 are not limited to the above. For example, the retainer 10 may include the foregoing elements that are manufactured separately and are connected to one another with any connecting means. Moreover, the foregoing elements may be made of different materials.

To assemble the driver airbag apparatus, the tip of the inflator is inserted into the inflator opening 10c of the retainer 10, and a flange (not illustrated) of the inflator is placed over the back surface of the main plate portion 10a of the retainer 10. Furthermore, on the front-surface side of the main plate portion 10a, an inflator opening (not illustrated) provided on the rear-end side of the airbag is positioned over the portion around the inflator opening 10c, and a pressing ring (not illustrated) is placed around the inflator opening from the inside of the airbag. In this step, stud bolts (not illustrated) of the pressing ring are fitted into bolt-fitting holes (not illustrated) provided around the inflator opening of the airbag, the bolt-fitting holes 10d provided in the retainer 10, and bolt-fitting holes (not illustrated) provided in the flange of the inflator; and nuts (not illustrated) are screwed onto the respective stud bolts. Thus, the airbag and the inflator are secured to the retainer 10. Subsequently, the module cover is placed on the front-surface side of the retainer 10 in such a manner as to cover the folded body of the airbag, and the module cover is secured to the retainer 10. Thus, the assembling of the driver airbag apparatus is finished.

Note that the procedure of assembling the driver airbag apparatus and the structure of securing the airbag and the inflator to the retainer 10 are not limited to the above.

The procedure of attaching the driver airbag apparatus to the steering wheel 1 will now be described.

First, the driver airbag apparatus is positioned on the front-surface side of the steering wheel 1 such that the back surface of the main plate portion 10a of the retainer 10 faces the front surface of the steering hub portion 2. In this step, as illustrated in FIGS. 2 and 5a, each attachment piece 11 is made to overlap a corresponding one of the brackets 6 on the side nearer to the center of the steering wheel 1, and the bracket 6 is fitted between the guide pieces 14 and 14 of the attachment piece 11. Subsequently, the driver airbag apparatus is pushed toward the steering wheel 1, whereby the retainer 10 is brought near to the steering hub portion 2.

In this step, from the state illustrated in FIG. 5a to the state illustrated in FIG. 5b, the projecting portion 12 of each attachment piece 11 comes into contact with the surface of a corresponding one of the brackets 6 nearer to the center of the steering wheel 1, a pressing force is applied to the projecting portion 12 toward the center of the steering wheel 1, the elastically deformable portion 13 elastically deforms, and the projecting portion 12 retracts toward the center of the steering wheel 1. Thus, the attachment piece 11 is allowed to move along the bracket 6 toward the steering hub portion 2. From the state illustrated in FIG. 5b to the state illustrated in FIG. 5c, when the attachment piece 11 has moved toward the steering hub portion 2 by a specific length or more and the projecting portion 12 has reached the opening 6a of the bracket 6, the elastically deformable portion 13 elastically restores the original form, and the projecting portion 12 engages with the opening 6a. Thus, the driver airbag apparatus is joined to the steering wheel 1 in such a manner as not to move away from the steering wheel 1.

In this embodiment, when the attachment pieces 11 are moved toward the steering hub portion 2 along the respective brackets 6 until the projecting portions 12 engage with the respective openings 6a, the tips of the attachment pieces 11 and the guide pieces 14 engage with the individual grooves 7 provided in the front surface of the steering hub portion 2. Furthermore, in this step, the first guide projections 15 at the tips of the attachment pieces 11 engage with the recesses 8 provided in the grooves 7, and the second guide projections 16 at the tips of the guide pieces 14 engage with the right and left side surfaces of the steering hub portion 2.

Thus, the work of attaching the driver airbag apparatus to the steering wheel 1 is finished.

As described above, in the driver-airbag-apparatus-attaching structure, the snap-lock mechanisms enable the driver airbag apparatus to be attached to the steering wheel 1 with a single motion. Therefore, it is easy to perform the work of attaching the driver airbag apparatus to the steering wheel 1.

In this embodiment, the brackets 6 are each held between the guide pieces 14 and 14 of a corresponding one of the attachment pieces 11. Therefore, when the driver airbag apparatus is brought near to the steering hub portion 2, the attachment pieces 11 assuredly move along the respective brackets 6. Thus, the projecting portions 12 of the attachment pieces 11 can be assuredly made to engage with the openings 6a of the respective brackets 6.

Furthermore, in this embodiment, when the attaching of the driver airbag apparatus is finished, the first guide projections 15 at the tips of the attachment pieces 11 engage with the recesses 8 provided in the grooves 7 on the sides of the brackets 6 nearer to the center of the steering wheel 1, and the second guide projections 16 at the tips of the guide pieces 14 engage with the right and left side surfaces of the steering hub portion 2 on the sides of the brackets 6 nearer to the outer periphery of the steering wheel 1. Therefore, the retainer 10 is assuredly held at the predetermined position and is also prevented from rattling.

In the driver-airbag-apparatus-attaching structure, the elastically deformable portions 13 of the attachment pieces 11 projecting from the retainer 10 of the driver airbag apparatus elastically deform, whereby the projecting portions 12 provided on the attachment pieces 11 elastically engage with the openings 6a of the brackets 6 standing from the front surface of the steering hub portion 2. Therefore, no anchoring wires for anchoring the attachment pieces 11 need to be provided on the steering hub portion 2. Accordingly, the driver-airbag-apparatus-attaching structure can have a simple configuration.

Furthermore, since no anchoring wires are provided on the steering hub portion 2, the space in the steering hub portion 2 that is occupied by the driver-airbag-apparatus-attaching structure can be reduced. Therefore, limitations in providing devices such as a damper, a paddle switch, and a cruise control switch, excluding the driver-airbag-apparatus-attaching structure, in the steering hub portion 2 are reduced or eliminated.

Furthermore, in this embodiment, each of the openings 6a is a through hole extending through a corresponding one of the brackets 6. Therefore, in the state where the driver airbag apparatus has been attached to the steering wheel 1, a stick-like tool may be inserted into the opening 6a from the side of the bracket 6 nearer to the outer periphery of the steering wheel 1 and the projecting portion 12 may be pushed toward the center of the steering wheel 1 such that the projecting portion 12 is pushed out of the opening 6a. Thus, the driver airbag apparatus may be removed from the steering wheel 1.

Figure 6:
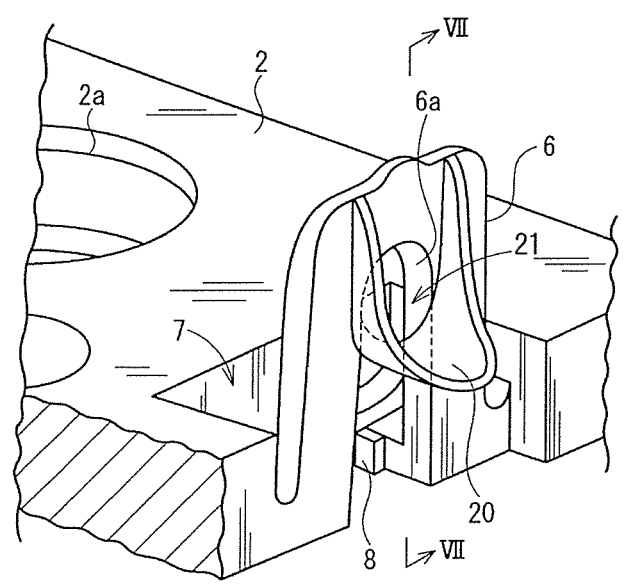
FIG. 6 is a perspective view of a bracket and near elements included in a driver-airbag-apparatus-attaching structure according to another embodiment.

FIG. 6 is a perspective view of a bracket and near elements included in a driver-airbag-apparatus-attaching structure according to another embodiment.

In this embodiment, each bracket 6 has a tool guide 20 on the side thereof nearer to the outer periphery of the steering wheel 1. The tool guide 20 guides the insertion of a projecting-portion-pushing tool T into the opening 6a.

In this embodiment, the tool guide 20 forms a projecting piece projecting from the surface of the bracket 6 nearer to the outer periphery of the steering wheel 1 toward the outer periphery of the steering wheel 1. As illustrated in FIG. 6, the tool guide 20 in the form of a projecting piece extends across the opening 6a, which has an oblong-hole shape, at a halfway position in the longitudinal direction of the opening 6a, thereby sectioning the opening 6a into a front-end side and a rear-end side with respect to the halfway position. The tool guide 20 also has a substantially U shape surrounding the front-end side of the opening 6a with respect to the halfway position. The space defined by the inner peripheral surface of the tool guide 20 and the peripheral edge of the front-end side of the opening 6a provides an insertion portion 21 into which the tool T is to be inserted. The axial direction of the tool guide 20 with respect to the inner peripheral surface corresponds to a direction substantially orthogonal to the plate surface of the bracket 6.

Note that the shape of the tool guide 20 is not limited to the above. For example, the tool guide 20 may have a cylindrical shape that surrounds the entire periphery of the insertion portion 21, or the like.

The tool T only needs to be a member that is insertable into the insertion portion and with which the projecting portion 12 can be pushed. The tool T may be an exclusive tool, or any stick-like tool such as a driver may be used as the tool T.

The back cover 5 of the steering wheel 1 has on the right and left side surfaces thereof working holes (not illustrated) through each of which the tool T is to be inserted into the insertion portion 21 of a corresponding one of the brackets 6.

Figure 7A:
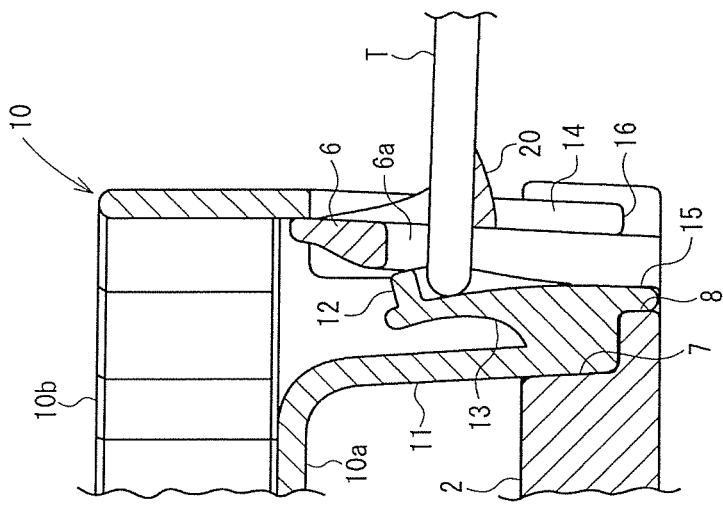
FIGS. 7a and 7b are sectional views of a snap-lock mechanism taken along line VII-VII of FIG. 6.
Figure 7B:
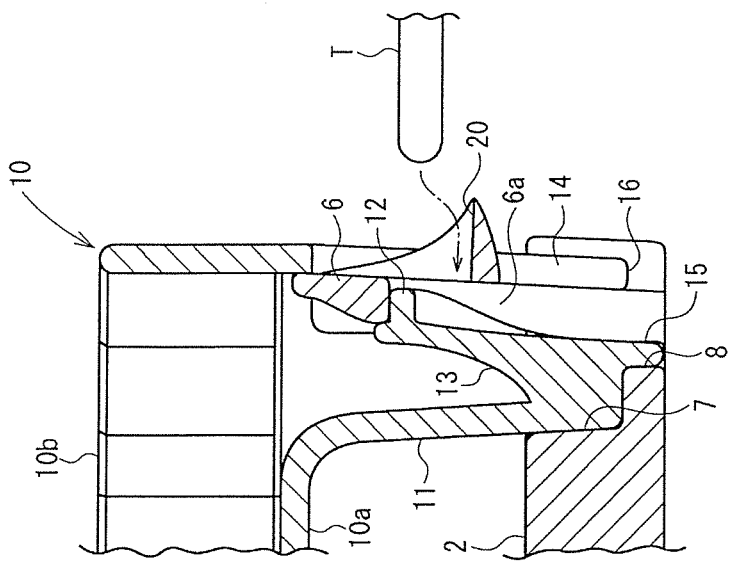

The other configurations according to this embodiment are the same as those of the above embodiment illustrated in FIGS. 1 to 5c, and reference numerals used in FIGS. 6 to 7b that are the same as those used in FIGS. 1 to 5c denote the same elements as those illustrated in FIGS. 1 to 5c.

In this embodiment also, in the state where the driver airbag apparatus has been attached to the steering wheel 1, the tool T is inserted into the insertion portion 21 at each of the openings 6a from the side of a corresponding one of the brackets 6 nearer to the outer periphery of the steering wheel 1 such that a corresponding one of the projecting portions 12 is pushed toward the center of the steering wheel 1 and is pushed out of the opening 6a. Thus, the driver airbag apparatus can be removed from the steering wheel 1. In this step, as illustrated in FIGS. 7a and 7b, the tool T can be assuredly inserted into the insertion portion 21 by bringing the tool T into contact with the inner peripheral surface of the tool guide 20. Moreover, the tool T is prevented from missing the projecting portion 12 when the projecting portion 12 is to be pushed with the tool T.

Figure 8:
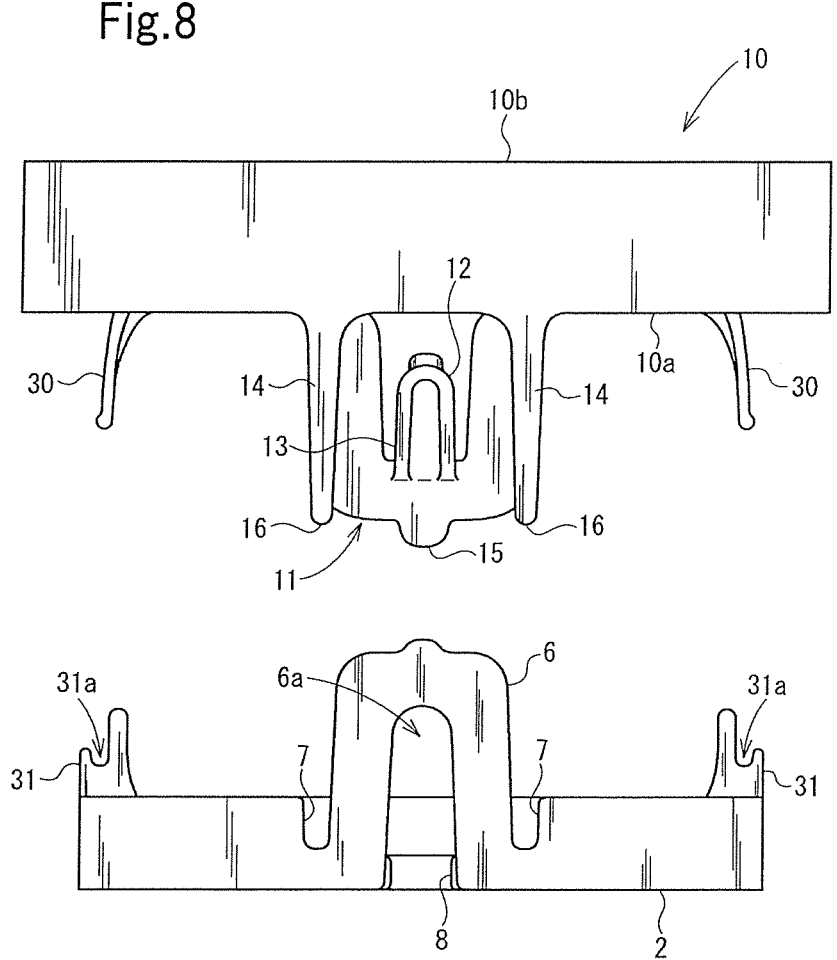
FIG. 8 is a side view (exploded view) of a retainer and a steering hub portion included in a driver-airbag-apparatus-attaching structure according to yet another embodiment.
Figure 9:
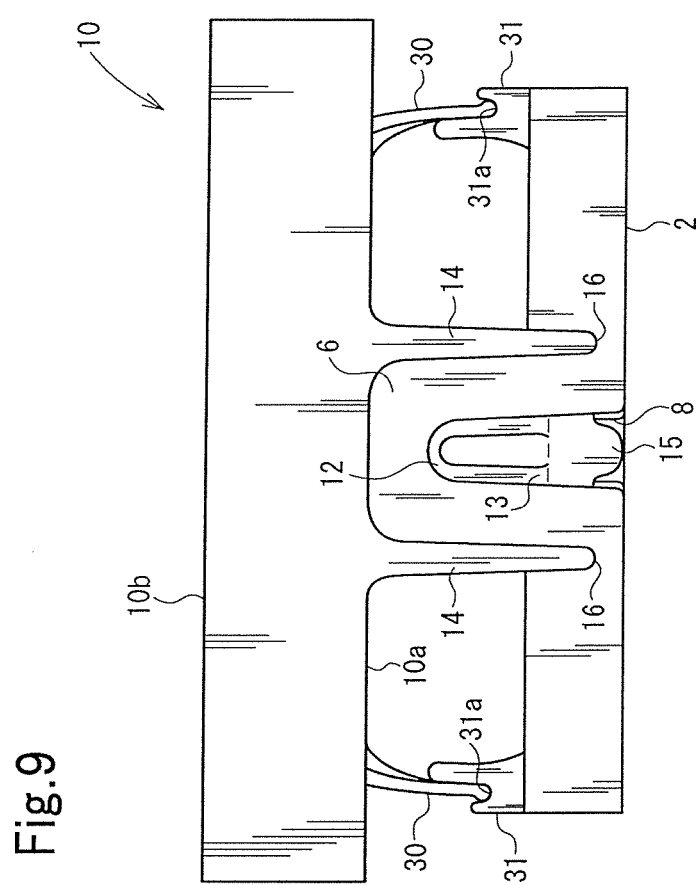
FIG. 9 is a side view of the part illustrated in FIG. 8 in a state after the driver airbag apparatus has been attached.

FIG. 8 is a side view (exploded view) of a retainer and a steering hub portion included in a driver-airbag-apparatus-attaching structure according to yet another embodiment. FIG. 9 is a side view of the part illustrated in FIG. 8 in a state after the driver airbag apparatus has been attached.

In this embodiment, the retainer 10 has leg-like pieces 30 projecting from the back surface of the main plate portion 10a thereof at respective positions different from the positions of the attachment pieces 11. The attachment pieces 11 are provided at the same positions as in the embodiment illustrated in FIGS. 1 to 5; that is, the attachment pieces 11 are provided on the right and left sides, respectively, with respect to the center of the main plate portion 10a. In this embodiment, the leg-like pieces 30 are provided at two positions on the upper and lower sides, respectively, with respect to the center of the main plate portion 10a.

In this embodiment, the leg-like pieces 30 and the main plate portion 10a are made of a common molding material and are molded into an integral body. Alternatively, the leg-like pieces 30 and the main plate portion 10a may be manufactured separately and be connected to each other with any connecting means.

The steering hub portion 2 has on the front surface thereof supporting portions 31 that support the respective leg-like pieces 30 when the driver airbag apparatus is attached to the steering hub portion 2. Reference numeral 31a denotes recesses with which the tips of the respective leg-like pieces 30 engage. The recesses 31a are provided on the front-surface side of the supporting portions 31.

In this embodiment, the leg-like pieces 30 and the supporting portions 31 form contact portions at which the driver airbag apparatus and the steering hub portion 2 come into contact with each other. The contact portions prevent the driver airbag apparatus from turning about a line connecting the two snap-lock mechanisms.

The other configurations according to this embodiment are the same as those of the above embodiment illustrated in FIGS. 1 to 5, and reference numerals used in FIGS. 8 and 9 that are the same as those used in FIGS. 1 to 5 denote the same elements as those illustrated in FIGS. 1 to 5.

The procedure of attaching the driver airbag apparatus to the steering wheel 1 employed in this embodiment is also the same as that employed in the embodiment illustrated in FIGS. 1 to 5.

In this embodiment, in attaching the driver airbag apparatus to the steering wheel 1, when the driver airbag apparatus is brought near to the steering hub portion 2 until the projecting portions 12 of the attachment pieces 11 engage with the respective openings 6a of the brackets 6, the tips of the leg-like pieces 30 engage with the respective recesses 31a of the supporting portions 31, whereby the leg-like pieces 30 are supported by the respective supporting portions 31.

That is, in the driver-airbag-apparatus-attaching structure according to this embodiment, the right and left sides of the retainer 10 are supported by the steering hub portion 2 with the aid of the respective snap-lock mechanisms (the brackets 6, the attachment pieces 11, the projecting portions 12, and so forth), and the upper and lower sides of the retainer 10 are supported by the steering hub portion 2 with the aid of the respective leg-like pieces 30 and the respective supporting portions 31. Thus, the leg-like pieces 30 and the supporting portions 31 prevent the driver airbag apparatus from turning about the line connecting the right and left snap-lock mechanisms.

The above embodiments are merely examples of the present invention, and the present invention is not limited thereto.

For example, in each of the above embodiments, the snap-lock mechanism (the bracket 6 and the attachment piece 11) is provided on each of two positions on the right and left sides with respect to the center of the steering wheel 1. The arrangement of the snap-lock mechanisms is not limited to the above. For example, the snap-lock mechanism may be provided at each of two positions on the upper and lower sides with respect to the center of the steering wheel 1. In such an arrangement, the leg-like pieces 30 and the supporting portions 31 that prevent the driver airbag apparatus from turning about the line connecting the two snap-lock mechanisms are preferably provided at two respective positions on the right and left sides with respect to the center of the steering wheel 1.

In the present invention, one or three or more snap-lock mechanisms may be provided.

While the present invention has been described in detail by taking specific embodiments, it is obvious to those skilled in the art that various changes can be made to those embodiments without departing from the spirit and scope of the present invention.

The invention claimed is:

1. A driver-airbag-apparatus-attaching structure with which a driver airbag apparatus is attached to a front surface of a steering wheel,
the driver-airbag-apparatus-attaching structure enabling the driver airbag apparatus to be attached to the steering wheel with the aid of a snap-lock mechanism,
wherein the snap-lock mechanism includes
a bracket projecting upwardly from the front surface of the steering wheel;
an attachment piece projecting downwardly from a bottom surface of the driver airbag apparatus toward the steering wheel in such a manner as to overlap the bracket;
an engaging portion provided on a surface of the bracket that is to face the attachment piece; and
a projecting portion projecting from a surface of the attachment piece that is to face the bracket, and
wherein, when the driver airbag apparatus is bought near to the steering wheel, the attachment piece moves downwardly along the bracket, and the projecting portion receives a reactive force from the bracket, whereby the attachment piece elastically deforms; when the projecting portion reaches the engaging portion, the attachment piece elastically restores back to the original form thereof, and the projecting portion engages with the engaging portion at an engagement interface therebetween prior to airbag deployment with the driver airbag apparatus attached to the steering wheel, and
a guide portion having opposite side portions at either side of the projecting portion that extend downwardly beyond the projecting portion to be configured to receive the upwardly projecting bracket therebetween to guide the attachment piece as the attachment piece moves down along the bracket with the opposite side portions at either side of the bracket; and
seating surfaces at distal, lower end portions of the attachment piece and about a proximal, lower end of the bracket that engage each other below the engagement interface with the projecting portion engaged with the engaging portion to attach the driver airbag apparatus to the steering wheel.

2. The driver-airbag-apparatus-attaching structure according to claim 1, wherein the guide portion is provided on the attachment piece.

3. The driver-airbag-apparatus-attaching structure according to claim 1, wherein the snap-lock mechanism is one of two snap-lock mechanisms provided on opposite sides of a position near the center of the steering wheel.

4. The driver-airbag-apparatus-attaching structure according to claim 3, comprising a contact portion at which the driver airbag apparatus and the steering wheel come into contact with each other, the contact portion preventing the driver airbag apparatus from turning about a line connecting the two snap-lock mechanisms.

5. A steering wheel to which a driver airbag apparatus is attached with the driver-airbag-apparatus-attaching structure according to claim 1.

6. A driver-airbag-apparatus-attaching structure with which a driver airbag apparatus is attached to a front surface of a steering wheel,
the driver-airbag-apparatus-attaching structure enabling the driver airbag apparatus to be attached to the steering wheel with the aid of a snap-lock mechanism, wherein the snap-lock mechanism includes
a bracket projecting upwardly from the front surface of the steering wheel;
an attachment piece projecting downwardly from a bottom surface of the driver airbag apparatus toward the steering wheel in such a manner as to overlap the bracket;
an engaging portion provided on a surface of the bracket that is to face the attachment piece; and
a projecting portion projecting from a surface of the attachment piece that is to face the bracket, and
wherein, when the driver airbag apparatus is bought near to the steering wheel, the attachment piece moves downwardly along the bracket, and the projecting portion receives a reactive force from the bracket, whereby the attachment piece elastically deforms in a direction transverse to the downward movement thereof; when the projecting portion reaches the engaging portion, the attachment piece elastically restores back to the original form thereof, and the projecting portion engages with the engaging portion, whereby the driver airbag apparatus is attached to the steering wheel,
wherein the attachment piece is provided at a position nearer to the center of the steering wheel with respect to the bracket, and
wherein the bracket has an insertion through opening that faces in the transverse direction to allow a pressing tool to be inserted therethrough in the transverse direction by which the attachment piece is pushed in the transverse direction and moved away from the bracket toward the center of the steering wheel.

7. The driver-airbag-apparatus-attaching structure according to claim 6, wherein the bracket has a tool guide that guides the insertion of the tool into the insertion through opening.

\* \* \* \* \*